US009118828B2

(12) United States Patent
Okazawa

(10) Patent No.: US 9,118,828 B2
(45) Date of Patent: Aug. 25, 2015

(54) IMAGING DEVICE AND CONTROL METHOD FOR IMAGING DEVICE

(71) Applicant: Olympus Imaging Corporation, Shibuya-ku, Tokyo (JP)

(72) Inventor: Atsuro Okazawa, Hino (JP)

(73) Assignee: OLYMPUS CORPORATION (JP)

( * ) Notice: Subject to any disclaimer, the term of this patent is extended or adjusted under 35 U.S.C. 154(b) by 270 days.

(21) Appl. No.: 13/673,491

(22) Filed: Nov. 9, 2012

(65) Prior Publication Data
US 2013/0120609 A1 May 16, 2013

(30) Foreign Application Priority Data
Nov. 11, 2011 (JP) .................................. 2011-247209

(51) Int. Cl.
H04N 5/232 (2006.01)
H04N 5/369 (2011.01)

(52) U.S. Cl.
CPC ......... *H04N 5/23212* (2013.01); *H04N 5/3696* (2013.01)

(58) Field of Classification Search
CPC .. H04N 5/23212; H04N 5/367; H04N 5/3675
USPC ......... 348/246, 272, 273, 278–281, 345, 349, 348/350, 354
See application file for complete search history.

(56) References Cited

U.S. PATENT DOCUMENTS

| 6,404,918 | B1 * | 6/2002 | Hel-or et al. ................. 382/167 |
| 6,829,008 | B1 | 12/2004 | Kondo et al. |
| 2007/0237512 | A1 | 10/2007 | Kusaka |
| 2009/0096903 | A1 * | 4/2009 | Kusaka .......................... 348/302 |
| 2010/0194967 | A1 * | 8/2010 | Amano .......................... 348/345 |
| 2011/0085785 | A1 * | 4/2011 | Ishii .............................. 396/104 |
| 2011/0109775 | A1 * | 5/2011 | Amano .......................... 348/241 |
| 2011/0228147 | A1 * | 9/2011 | Matsuo et al. ................ 348/273 |
| 2012/0236185 | A1 * | 9/2012 | Ishii .............................. 348/246 |

FOREIGN PATENT DOCUMENTS

| JP | 3592147 | 11/2004 |
| JP | 2010062640 | 3/2010 |

* cited by examiner

*Primary Examiner* — Timothy J Henn
(74) *Attorney, Agent, or Firm* — Volpe and Koenig, P.C.

(57) ABSTRACT

An imaging device of the present invention comprises an image sensor provided with phase detection pixels for focus detection at some of its pixels, a contrast information detection section for detecting contrast information of a formed image from pixels, among pixel data output from the image sensor, positioned close to the phase detection pixels, a phase detection pixel correction determination section for determining whether or not to correct data of the phase detection pixel based on the detected contrast information, a weighting determination section for determining a weighting for neighboring pixels to the phase detection pixels based on the detected contrast information, a pixel correction section for carrying out weighted correction of the phase detection pixels based on the determined weighting, and a color conversion processing section for carrying out conversion processing for display of the image data or to create an image for storage, after the pixel correction.

6 Claims, 8 Drawing Sheets

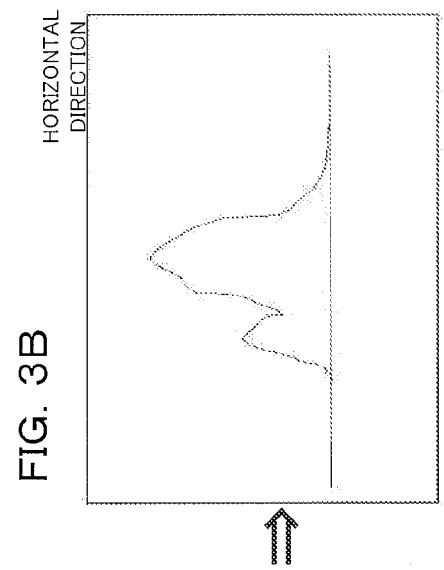
FIG. 3B
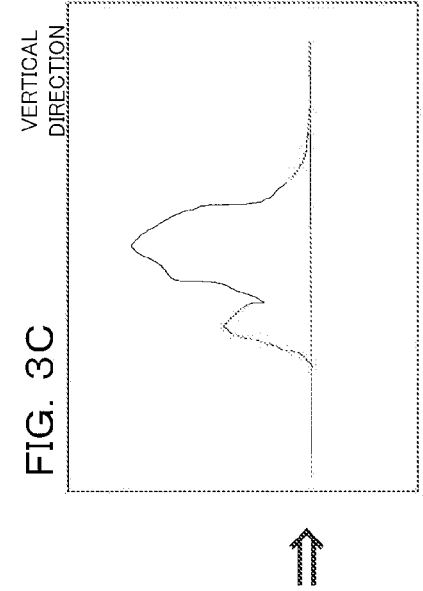
FIG. 3C
FIG. 3A

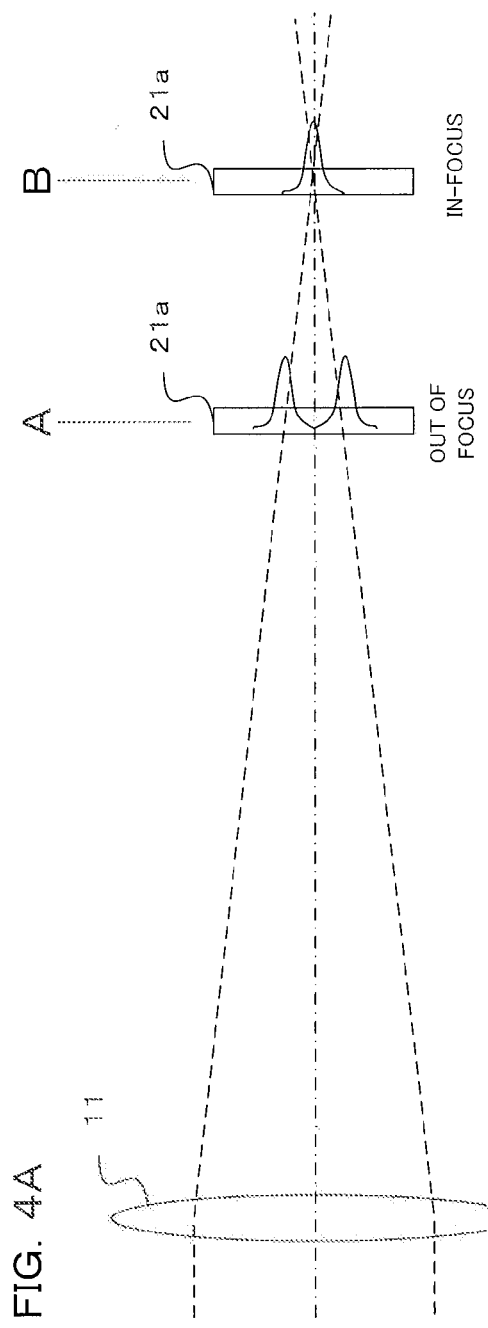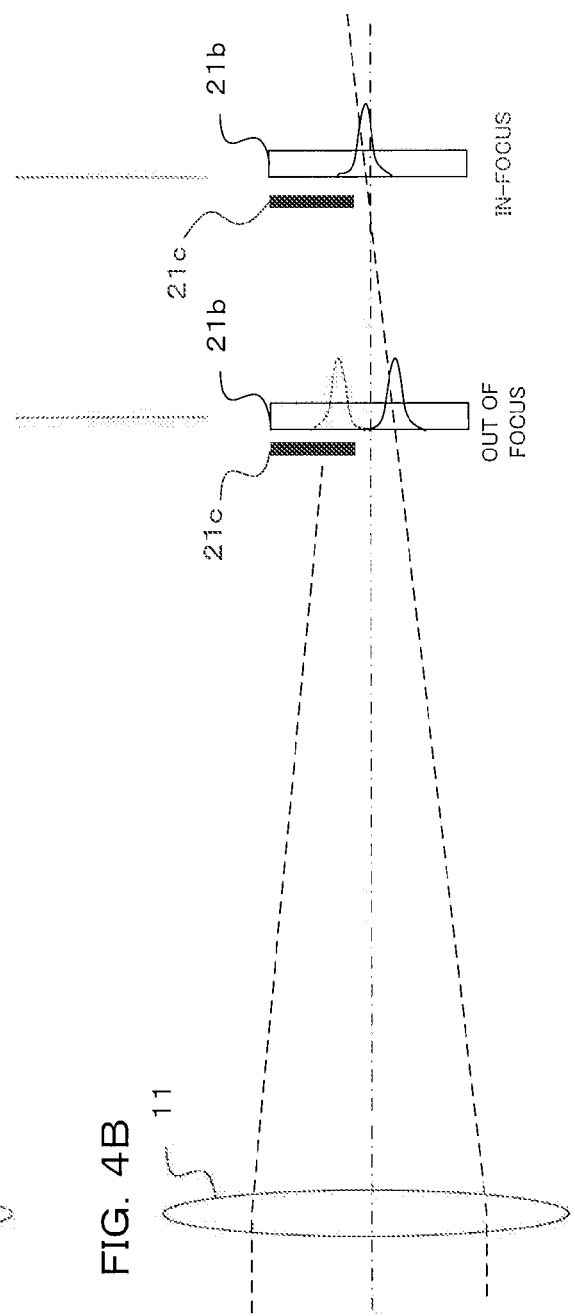

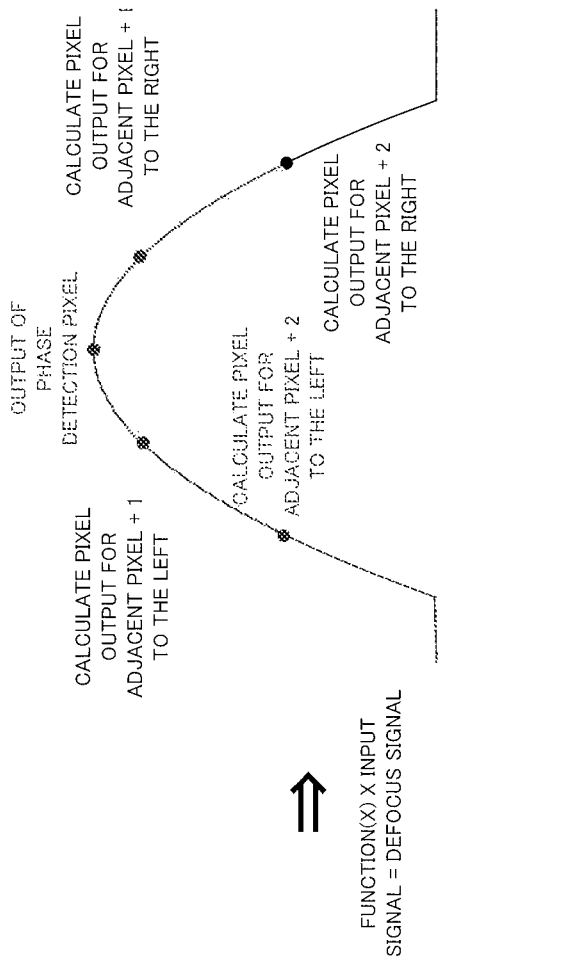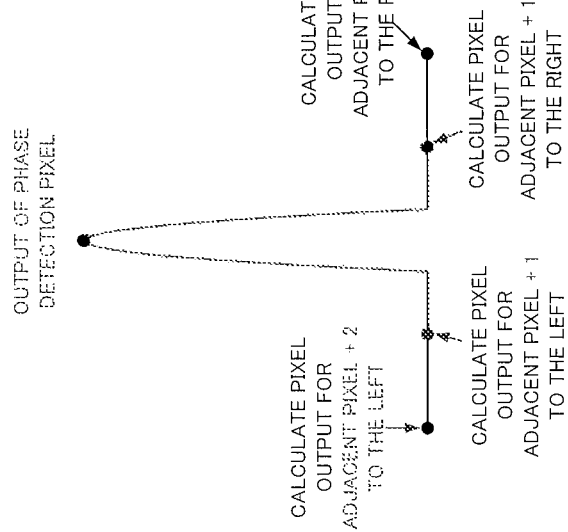

FIG. 8

| | DATA | IN FOCUS STATE | | |
|---|---|---|---|---|
| | | OUT OF FOCUS (LARGE BOKE) | OUT OF FOCUS | IN-FOCUS |
| PIXEL OUTPUT | $n_i$ | | | |
| A. OUT OF FOCUS DETECTION | $\lvert \sum (n_i - n_{i-1}) \rvert$ DIFFERENTIAL SOME | SMALL | MEDIUM | LARGE |
| WEIGHTING | | SMALL | MEDIUM | LARGE |
| B. HIGH-FREQUENCY DETECTION | $\max\{\lvert n_i - n_{i-1} \rvert\}$ DIFFERENTIAL MAXIMUM VALUE | SMALL | MEDIUM | LARGE |
| WEIGHTING | | SMALL | MEDIUM | LARGE |

IMAGING DEVICE AND CONTROL METHOD FOR IMAGING DEVICE

Benefit is claimed, under 35 U.S.C. §119, to the filing date of prior Japanese Patent Application No. 2011-247209 filed on Nov. 11, 2011. This application is expressly incorporated herein by reference. The scope of the present invention is not limited to any requirements of the specific embodiments described in the application.

BACKGROUND OF THE INVENTION

1. Field of the Invention

The present invention relates to an imaging device having an image sensor, parts of which are used as phase difference method focus detection elements, and to a control method for the imaging device.

2. Description of the Related Art

An image sensor that also has part thereof functioning as photodiodes for focus detection is known (refer to Japanese patent No. 3592147 (referred to hereafter as patent literature 1)). With the image sensor shown in patent literature 1, each pixel of a region that is utilized for focus detection is divided into two pixels, and these two pixels are subjected to subject light flux that has passed through a pupil exit region (hereafter referred to as "pupil region") that differs depending on a photographing lens, by means of respective on-chip microlenses. Focus state is then detected based on a phase difference between two images that are represented by two image signals that have passed through the differing pupil regions.

Also, when parts of an image sensor are utilized as focus detection elements, as disclosed in patent literature 1, sections that are made the focus detection element constitute defective pixels, and an image is degraded. Interpolation processing for the element outputs is therefore carried out in order to make up for lack of output of the focus detection elements. However, when light of a subject image having high spatial frequency is received, reduction in image sharpness due to the effects of interpolation are very noticeable. With the imaging device disclosed in Japanese patent laid-open No. 2010-062640 (hereafter referred to as patent literature 2) therefore, signal variation at the periphery of a focus detection element is detected, and a proportion of gain adjustment amount to interpolation correction amount is determined based on the results of this detection.

SUMMARY OF THE INVENTION

An object of the present invention is to provide an imaging device that reduces image deterioration when carrying out interpolation processing on output of focus detection elements, regardless of the nature of a subject, and a control method for the imaging device.

An imaging device of the present invention comprises an image sensor provided with phase detection pixels for focus detection at some of its pixels, a contrast information detection section for detecting contrast information of a formed image from pixels, among pixel data output from the image sensor, positioned close to the phase detection pixels, a phase detection pixel correction determination section for determining whether or not to correct data of the phase detection pixel based on the detected contrast information, a weighting determination section for, when it has been determined in the phase detection pixel correction determination section that the phase detection pixel will be corrected, determining a weighting for neighboring pixels to the phase detection pixels based on the detected contrast information, a pixel correction section for carrying out weighted correction of the phase detection pixels based on the determined weighting, and a color conversion processing section for carrying out conversion processing for converting the image data into an image for display or an image for storage, after the pixel correction.

An imaging device of the present invention comprises an image sensor provided with phase detection pixels for focus detection at some of its pixels, a contrast information detection section for detecting contrast information of a formed image from pixels, among pixel data output from the image sensor, positioned close to the phase detection pixels, a weighting determination section for determining a weighting for neighboring pixels to the phase detection pixels based on the detected contrast information, a pixel correction section for carrying out weighted correction of the phase detection pixels based on the determined weighting, and a color conversion processing section for carrying out conversion processing for display of the image data or to create an image for storage, after the pixel correction.

A control method for an imaging device of the present invention having groups of imaging pixels and groups of phase detection pixels comprises an adjustment step of adjusting gain for the phase detection pixel group, a detection step of detecting at least one of a variation gradient, a variation amount and an integrated value of variation amount, of a pixel group that is close to the phase detection pixels of an image sensor, a determination step of determining, based on the value of the at least one of the variation gradient, variation amount, and integrated value of variation amount that was detected in the detection step, an appropriate proportion for interpolation pixels with respect to the phase detection pixels, and an interpolation step of interpolating the phase detection pixels in accordance with the result of the determination step.

BRIEF DESCRIPTION OF THE DRAWINGS

FIG. 3A-FIG. 3C are drawings showing pixels and phase detection pixels within an image sensor of a camera of one embodiment of the present invention, and pixel signals for those pixels.

FIG. 4A and FIG. 4B are drawings for explaining the principle of focus detection of the camera of one embodiment of the present invention.

FIG. 7A and FIG. 7B are graphs showing spatial variation of image signals for an in-focus state and an out-of-focus state for the camera of one embodiment of the present invention.

FIG. 8 is a drawing for explaining a method of determining a weighting coefficient used at the time of interpolation calculation, for each focus state, for the camera of one embodiment of the present invention.

DETAILED DESCRIPTION OF THE PREFERRED EMBODIMENTS

Preferred embodiments using a camera to which the present invention has been applied will be described in the following in accordance with the drawings. An imaging device of one preferred embodiment of the present invention is a digital camera, provided with an imaging section having an image sensor, at parts of which are provided phase detection elements for focus detection, with a subject image formed by this imaging section being converted to image data, and a defocus direction and defocus amount representing offset of focus position being calculated using a well-known phase difference method based on output from the phase detection elements, and focus adjustment of a photographing lens then being carried out.

Also, a live view image, being a real-time photographed subject image, is displayed on a display section arranged on a rear surface of a body, based on the converted image data. A photographer determines composition and photo opportunity by looking at the live view image. At the time of operation of a release button, still picture image data is stored in a storage medium. Also, at the time of movie shooting, movie image data is stored in a storage medium. Still picture and movie image data that has been stored in the storage medium can be played back and displayed on the display section if playback mode is selected.

Figure 1:
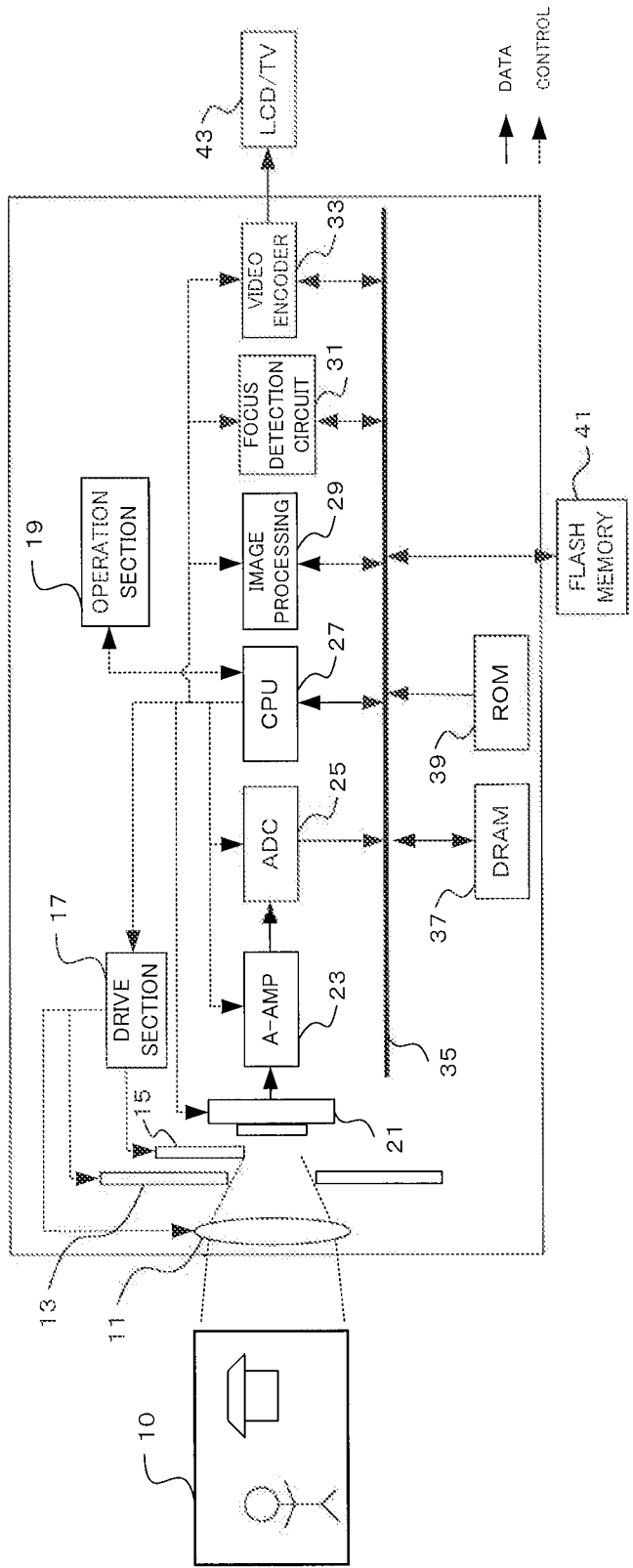
FIG. 1 is a block diagram mainly showing the structure of electrical circuits of a camera of one embodiment of the present invention.

FIG. 1 is a block diagram mainly showing the electrical structure of a camera of one embodiment of the present invention. In FIG. 1, solid lines with arrows represent flow of data, and dotted lines with arrows represent flow of control signals. Inside the camera are a photographing lens 11, aperture 13, mechanical shutter 15, drive section 17, operating section 19, image sensor 21, A-AMP 23, analog-to-digital converter (ADC) 25, CPU (central processing unit) 27, image processing section 29, focus detection circuit 31, video encoder 33, bus 35, DRAM (dynamic random access memory) 37, ROM (read-only memory) 39, and flash memory 41.

The photographing lens 11 is constituted by a plurality of optical lenses for forming a subject image, and is a fixed focal length lens or a zoom lens. The aperture 13 is arranged to the rear of this photographing lens 11 along the optical axis, and this aperture 13 has a variable opening diameter, to restrict the amount of subject light flux that passes through the photographing lens 11. The mechanical shutter 15 is arranged behind this aperture 13, and controls the amount of time for which subject like flux passes through the photographing lens. A well-known focal plane shutter or lens shutter etc. is adopted as the mechanical shutter 15.

The drive section 17 carries out focus adjustment of the photographing lens 11, opening diameter control of the aperture 13, and opening and closing control (shutter control) of the mechanical shutter 15, based on control signals from the CPU 27.

The operating section 19 includes operation members such as various input buttons, like a power supply button, release button, playback button, and menu button, and various input keys, and detects operating states of these operation members and outputs the result of detection to the CPU 27. With this embodiment, the operating section 19 has a shooting selection section for selecting still picture shooting and movie shooting, and it is possible to select still picture shooting mode and movie shooting mode with a shooting mode dial or on a menu screen etc. When movie shooting mode is selected, if the release button is operated movie shooting is commenced, and if the release button is pressed again movie shooting is stopped. It is also possible to replace with a different method, such as providing a movie button on the operating section 19 as a shooting selection section, and commencing movie shooting when the movie button is operated etc. As will be described later, with this embodiment, in the case where movie shooting has been selected, interpolation processing of the phase detection pixels is carried out, and correction of defective pixels caused by phase detection pixels is carried out.

An image sensor 21 is arranged on the optical axis of the photographing lens 11, behind the mechanical shutter 15, and close to a position where a subject image is formed by the photographing lens 11. Phase detection pixels for focus detection are provided at some pixels of the image sensor 21. The image sensor 21 also has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode.

A Bayer array color filter is arranged on the front surface of each pixel. A Bayer array has lines of R pixels and G pixels arranged alternately, and lines of G pixels and B pixels arranged alternately, in a horizontal direction. Some of the G pixels are replaced with phase detection pixels for focus detection. The detailed structure of this image sensor 21 will be described later using FIG. 3A-FIG. 3C. In this specification, as long as a signal is based on an image signal output from the image sensor 21 it will be referred to as image data, and this includes image signals, not only a signal that has been subjected to A/D conversion by the ADC 25, which will be described later.

Output of the image sensor 21 is connected to the A-AMP 23. The A-AMP 23 carries out analog gain adjustment for image signals that have been output from the image sensor 21. Output of the A-AMP 23 is connected to the ADC 25. The ADC 25 is an analog-to-digital converter, and converts an image signal that has been subjected to analog gain adjustment by the A-AMP 23 image data in a digital format (photographed data). Data from normal pixels that are not for focus detection, and data from phase detection pixels that are for focus detection, are both included in this photographed data. Output of the ADC 25 is output to the bus 35, and photographed data is temporarily stored in DRAM 37, which will be described later.

The CPU 27 that is connected to the bus 35 carries out overall control of the camera in accordance with programs stored in the ROM 39, which will be described later.

The image processing section 29 is input with photographed data from the DRAM 37 by means of the bus 35, and carries out various image processing, generates image data for storage for a still image or movie, and temporarily stores this generated image data for storage in the DRAM 37. Also, image data for display is generated using image data for a movie that has been read out from the DRAM 37, and temporarily stored in the DRAM 37. Data of phase detection pixels, at positions of focus detection pixels within the image sensor 21, is subjected to interpolation processing etc. using surrounding pixel data. The detailed structure of the image processing section 29 will be described later using FIG. 2.

The focus detection circuit 31 acquires data from phase detection pixels that has been temporarily stored in the DRAM 37, and calculates a defocus direction and defocus amount using well-known phase difference AF based on this data. Based on the defocus direction and defocus amount that have been calculated by the focus detection circuit 31, the CPU 27 carries out focusing of the photographing lens 11 using the drive section 17.

The video encoder 33 reads out image data for display that has been generated by the image processing section 29 and temporarily stored in the DRAM 37, and outputs to an LCD/TV 43. The LCD is a liquid crystal display, and is used at the time of live view display or playback display of already stored images on the rear surface of the camera etc. The TV is an external television set, and is used when playing back already stored images etc.

The DRAM 37 is an electrically rewritable memory, and, as described previously, performs temporary storage of image data, image data for storage, and image data for display etc. The DRAM 37 also performs temporary storage of various data for when the CPU 27 carries out camera control. It is also possible to use an SDRAM (Synchronous Dynamic Random Access Memory) for temporary storage of image data.

The ROM 39 is a nonvolatile memory such as mask ROM or flash memory. As well as the previously described programs used by the CPU 27, various data such as camera adjustment values also stored in the ROM 39. The flash memory 41 is built into the camera or is capable of being removed, and is a storage medium for image data storage.

Figure 2:
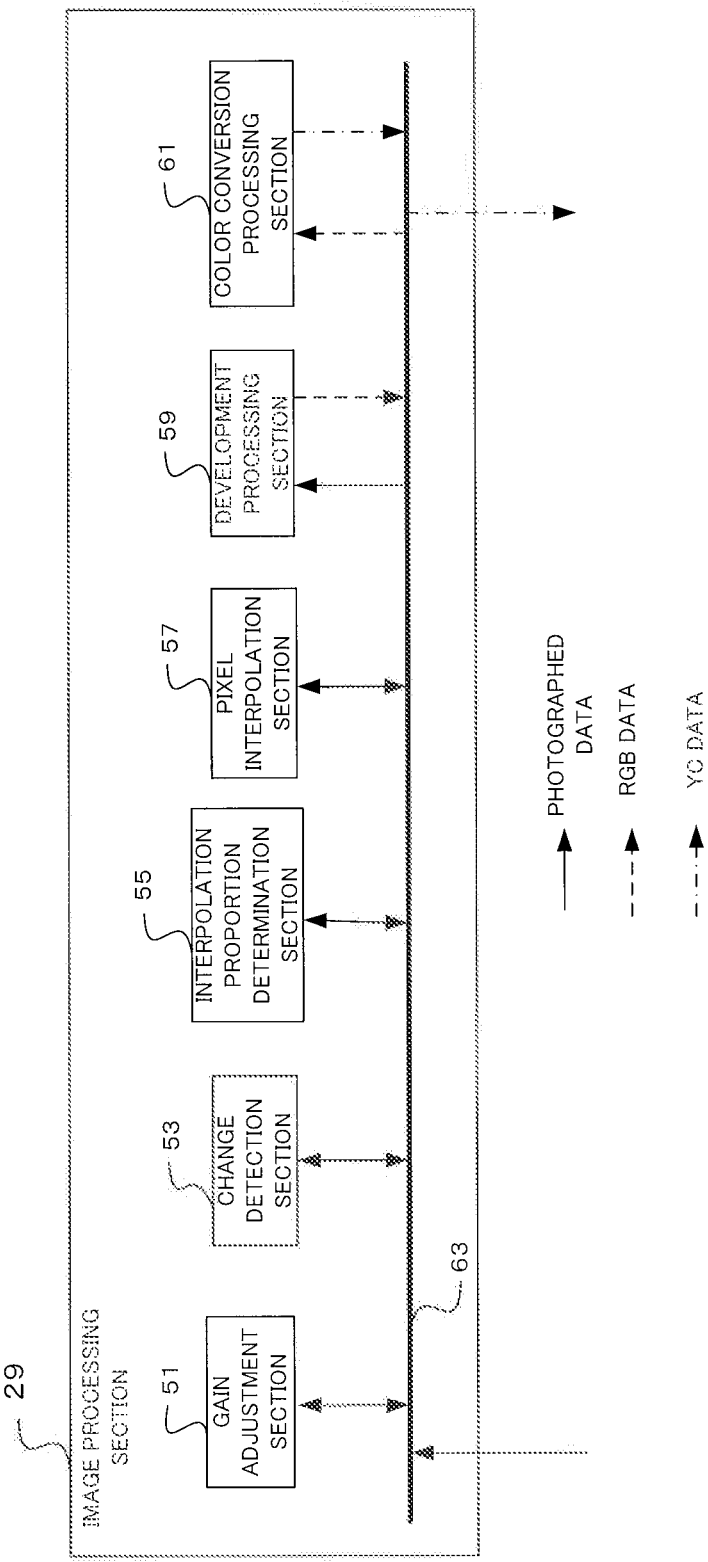
FIG. 2 is a block diagram showing the structure of an image processing section of a camera of one embodiment of the present invention.

Next, the image processing section 29 will be described using FIG. 2. In FIG. 2, solid lines with arrows represent flow of photographed data, dotted lines with arrows represent flow of RGB data, and dashed-dotted lines represent flow of YC data. Again adjustment section 51, change detection section 53, interpolation proportion determination section 55, pixel interpolation section 57, development processing section 59 and color conversion processing section 61 are connected to a bus 63 inside the image processing section 29.

The gain adjustment section 51 is input with photographed data that has been output from the ADC 25, and carries out gain correction on output from the phase detection pixels. Specifically, as will described later using FIG. 3A-FIG. 3C, and FIG. 4A and FIG. 4B, with phase detection pixels within the image sensor 21, light shielding members are provided for carrying out pupil division and detection of a phase difference, and as a result the amount of light reaching the phase detection pixels is reduced. Gain correction for image data from the phase detection pixels is carried out in correspondence with the amount of light reduction due to the light shielding.

The change detection section 53 functions as a contrast information detection section for detecting contrast information of a formed image from pixels, among pixel data output from the image sensor 21, positioned close to the phase detection pixels. The contrast information detection section also detects a change component addition value and a change component maximum value for pixels close to the phase detection pixels, as contrast information. Also, the contrast information detection section does not contain other phase detection pixels in the nearby pixels used in correction of the phase detection pixel.

The change detection section 53, specifically, calculates a change gradient and an integrated value of change amount for a pixel group that exists around the phase detection pixels 4 focus detection. Here, the change gradient for the pixel group means a difference between output of the phase detection pixels and output of the peripheral pixels, and a change gradient is calculated for every plurality of pixels that exist within a specified range around the phase detection pixels. The integrated value of the change value means an integrated value of the change gradient that has been calculated for every plurality of pixels.

The interpolation proportion determination section 55 functions as a phase pixel correction determination section for determining whether or not to correct data of the phase detection pixels based on the contrast information that was detected in the change detection section 53. Further, in the case where it has been determined that the phase detection pixels will be corrected, the interpolation proportion determination section 55 also functions as a weighting determination section for determining a weighting for peripheral pixels to the phase detection pixels. The weighting determination section determines a weighting for object pixels close to the phase detection pixels based on the change gradient and change amount for contrast that was detected as the contrast information. Also, the weighting determination section makes an appropriate proportion of interpolation pixels smaller in the case where the change gradient is small than in a case where the change gradient is large.

The interpolation proportion determination section 55 specifically determines a mixing ratio for output of the gain corrected phase detection pixels and output of the interpolation pixels, based on a value calculatedby the change detection section 53. Here, interpolation pixels means a plurality of pixels that exist within a specified range around the phase detection pixels.

The pixel interpolation section 57 functions as a pixel correction section for carrying out weighted correction of the phase detection pixels based on the determined weighting. The pixel interpolation section 57 performance interpolation processing on gain corrected output of the phase detection pixels using values of a plurality of pixels that exist within a specified range around the phase detection pixels, based on the mixing ratio determined by the interpolation proportion determination section 55.

The development processing section 59 applies demosaicing processing, noise reduction processing, white balance correction, and edge enhancement etc. to the interpolated photographed data, and converts into RGB data.

The color conversion processing section 61 functions as a color conversion processing section for carrying out color conversion processing for display of the image data or to create an image for storage, after the pixel correction. Specifically, the color conversion processing section 61 color converts developed RGB data and converts into YC data. As well as this, the image processing section 29 also carries out processing to give image data for storage and image data for display. Image data that has been image processed is output to the bus 35.

In this way, in the image processing section 29 interpolation processing is carried out for data, within the photographed data, corresponding to the phase detection pixels. Specifically, gain is corrected for data from phase detection pixels within the photographed data, a change gradient and integrated value for change gradient are detected for a pixel group that exists around the phase detection pixels, and interpolation processing is carried out on the output of the phase detection pixels based on the change gradient and the change gradient integrated value in accordance with the detection results.

Next, the structure of the image sensor 21 will be described using FIG. 3A-FIG. 3C. FIG. 3A is a drawing showing part of the image sensor 21 enlarged. In FIG. 3A C1-C16 are assigned as pixel numbers in the horizontal direction, and L1-L16 are assigned as pixel numbers in the vertical direction. With this example, pixel (C1, L1) is an R pixel, pixel (C2, L2) is a B pixel, and pixel (C2, L1) and pixel (C1, L2) are G pixels. This four-pixel combination is repeated in the horizontal direction and the vertical direction, to constitute the image sensor.

The arrangement of the image sensor of this embodiment is such that some image generating pixels for G are replaced with focus detection pixels. Specifically, with the example shown in FIG. 3A, a total of 12 focus detection pixels are included, namely pixel (C7, L2), pixel (C13, L2), pixel (C5, L4), pixel (C11, L4), pixel (C1, L6), pixel (C7, L6), pixel (C15, L8), pixel (C5, L10), pixel (C11, L10), pixel (C3, L12), pixel (C9, L12), and pixel (C14, L15). It is possible to detect phase difference in the horizontal direction for a screen of the image sensor 21 using these focus detection pixels. Specifically, pixel (C7, L2) and pixel (C5, L4) are not paired, and similarly pixel (C13, L2) and pixel (C11, L4) are not paired, and by detecting outputs of these pairs along the horizontal direction phase difference in the horizontal direction is detected.

With this embodiment, phase detection pixels are arranged in the image sensor 21 so as to detect phase difference along the horizontal direction, but this is not limiting and it is also possible to arrange the phase detection pixels cells to detect phase difference along a diagonal direction or the vertical direction. Also, with this embodiment, the phase detection pixels are arranged at positions corresponding to G pixels, but this is not limiting, and it is also possible to replace positions corresponding to R pixels and B pixels with phase detection pixels. Also, with this embodiment, focus detection pixels that have the right or left half of the pixel shielded from light are arranged, but this is not limiting, and it is also possible to have an arrangement where phase is detected with the upper half, lower half, or one diagonal half light shielded.

FIG. 3B shows one example of pixel signal values for the horizontal direction, and FIG. 3C shows one example of pixel signal values for the vertical direction. Specifically, FIG. 3B shows pixel signals for the horizontal direction that have been output from each of pixel (C1, L6) to pixel (C16, L6). Also, FIG. 3C shows pixel signals for the vertical direction that have been output from each of pixel (C5, L1) to pixel (C15, L16).

Next, the principle of focus detection using a phase difference method will be described using FIG. 4A and FIG. 4B. FIG. 4A shows non-phase detection pixels 21a for acquiring a normal image and that are not used as phase detection pixels, and FIG. 4B shows phase detection pixels 21b for focus detection and light shielding members 21c arranged in front of the phase detection pixels 21b. Position A represents a non-focus position of the non-phase detection pixels 21a (or phase detection pixels 21b) with respect to the photographing lens 11, and position B represents a focus position of the non-phase detection pixels 21a (or phase detection pixels 21b) with respect to the photographing lens 11.

If a case where the subject is a point light source is assumed, then in the case where the non-phase detection pixels 21a are at position A, which is a non-focus position, then as shown in FIG. 4A, peaks of subject light that has passed through the upper side of the photographing lens 11 and subject light that has passed through the lower side are respectively separated, and two peaks arise. On the other hand, in the case where the non-phase detection pixels 21a are at position B, which is a focus position, peaks of subject light that has passed through the upper side of the photographing lens 11 and subject light that has passed through the lower side match, and only a single peak arises.

Conversely, in the case where the phase detection pixels 21b are at position A, then as shown in FIG. 4B, subject light that has passed through the upper side of the photographing lens 11 is blocked by the light shielding member 21c and does not reach the phase detection pixels 21b. However, subject light that has passed through the lower side of the photographing lens 11 does reach the phase detection pixels 21b since there is no light shielding member 21c, but that position is offset to the lower side compared to the original focus position. In the case where the phase detection pixels are at position B, subject light that has passed through the upper side of the photographing lens 11 is blocked by the light shielding member 21c and does not reach the phase detection pixels 21b, but the subject light that has passed through the lower side of the photographing lens 11 does reach the phase detection pixels 21b as there is nothing blocking it.

As shown in FIG. 4B, the light shielding member 21c is arranged so as to block off subject light that has passed through the upper side of the photographing lens 11, and another phase detection pixel would have a light shielding member arranged so as to block subject light that has passed through the lower side of the photographing lens 11. This pair of phase detection pixels are arranged in the horizontal direction, vertical direction or diagonal direction, and it is possible to carry out focus detection using a phase difference method based on output signals from these phase detection pixels.

A phase detection pixel such as shown in FIG. 4B corresponds to the pixel (C7, L2), pixel (C13, L2), pixel (C5, L4), pixel (C11, L4) etc. in FIG. 3A. However, in FIG. 3A, since one pair of phase detection pixels (focus detection elements) are arranged in a diagonal direction, subject light is received from the upper diagonal part or lower diagonal part of the photographing lens 11. With this embodiment, pupil division has been carried out using light shielding members, but this is not limiting and it is also possible to carry out pupil division using lenses for pupil division or the like.

In a non-focus state, as shown in FIG. 4B the phase detection pixels have the light shielding members 21c which means that an image is formed at a position that is offset from the original imaging position, and phase offset arises resulting in an image that is difficult to see. On the other hand, in the focus state, even if a light shielding member 21c exists an image is formed at the original imaging position, and so no phase offset arises and the image does not become unsightly. In the non-focused state also, in a state with significant bokeh the overall image will have a lot of bokeh, and so phase offset will not be too noticeable. Accordingly, with this embodiment, in a non-focus state where phase offset occurs, output of the phase detection pixels is subjected to interpolation processing. However, if the outputs of the phase detection pixels are subjected to interpolation processing in the focused state then since interpolation processing is carried out there will be degradation of the image regardless of whether or not phase offset arises. With this embodiment, therefore, only gain correction is performed in the focus state, without interpolation processing being carried out.

Figure 5:
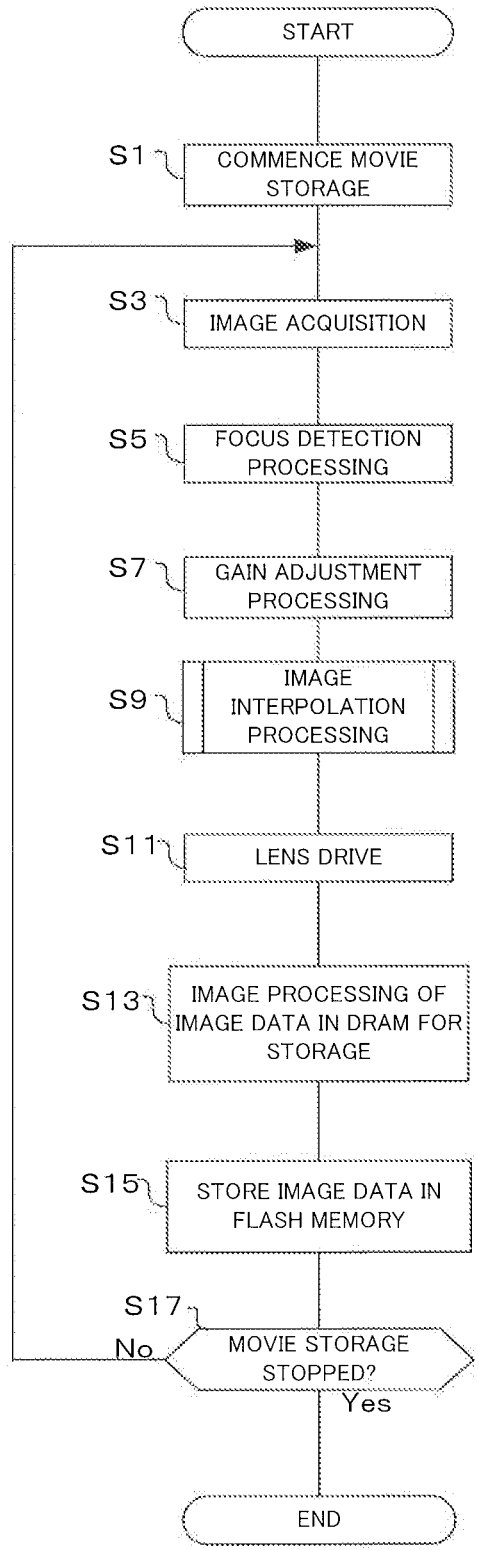
FIG. 5 is a flowchart showing operation of the camera of the one embodiment of the present invention.
Figure 6:
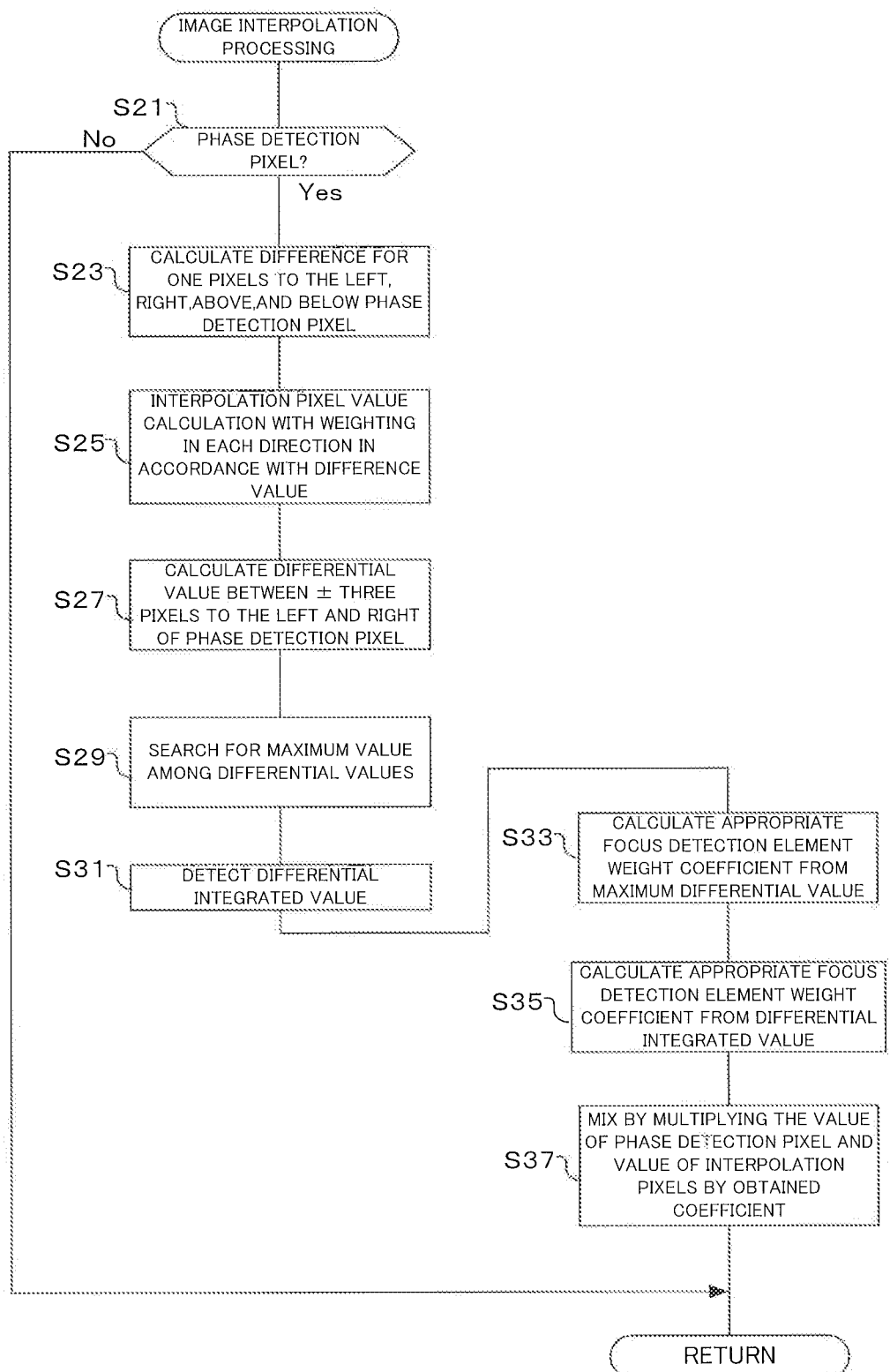
FIG. 6 is a flowchart showing operation of pixel interpolation processing of the camera of the one embodiment of the present invention.

Next, operation of one embodiment of the present invention will be described using the flowcharts shown in FIG. 5 to FIG. 6. These flowcharts are executed by the CPU 27 in accordance with programs stored in the ROM 39.

Operation of this flowchart commences if movie shooting is selected, and first movie storage is commenced (S1). Once movie storage has commenced, image acquisition is carried out next (S3). Here, a subject image is subjected to photoelectric conversion in the image sensor 21, and after an image signal has been converted to digital in the ADC 25, photographed data is temporarily stored in the DRAM 37.

Once image acquisition has been carried out, focus detection processing is carried out next (S5). Here, the focus detection circuit 31 reads out photographed data corresponding to a plurality of phase detection pixels from within the photographed data that has been temporarily stored in the DRAM 37, and calculates a defocus direction and defocus amount using a known phase difference method using this read out data.

Once focus detection has been carried out, gain adjustment processing is carried out next (S7). Here, gain adjustment is carried out for data corresponding to the phase detection pixels. Specifically, as shown in FIG. 4B, the phase detection pixels 21b for focus detection are blocked by light shielding members 21c, and so incident light amount is reduced. In this step, therefore, the gain adjustment section 51 carries out correction to the extent of the reduced light amount for the output of the phase detection pixels. Accordingly, this step S7 fulfills the function as an adjustment step for adjusting gain of a phase detection pixel group.

Once gain correction has been performed, pixel interpolation processing is next carried out (S9). Here pixel interpolation is carried out in accordance with output variation of elements surrounding the phase detection pixels, and the interpolated photographed data is temporarily stored in the DRAM 37. The pixel interpolation here detects, as contrast information, (1) an integrated value of a plurality of difference values between the outputs of the phase detection pixels and outputs of pixels peripheral to the phase detection pixels (difference addition value), and (2) a maximum value among a plurality of difference values between the outputs of the phase detection pixels and pixels peripheral to the phase detection pixels (difference maximum value), and based on the results of this detection determines a weighting for subject pixels peripheral to the phase detection pixels, and carries out pixel interpolation.

When carrying out weighting in the pixel interpolation, in the case where, based on the contrast information, there is a focused state, or in the case where a large degree of bokeh has been determined in a non-focused state, outputs of the phase detection pixels 21b are subjected to gain increase by the extent of reduced light amount. On the other hand in the case where, based on the contrast information, there is a non-focused state and it has been determined that there is not a large degree of bokeh, outputs of the phase detection pixels 21b are subjected to gain increase by the extent of reduced light amount, together with interpolation calculation to weight pixels that are peripheral to the phase detection pixels 21b. Detailed operation of the pixel interpolation processing of step S9 will be described later using FIG. 6.

Once the pixel interpolation processing has been carried out, lens drive is next performed (S11). Here, the CPU 27 carries out focusing in the drive section 17 based on the focus direction and the focus amount of the photographing lens 11 that were detected in step S5.

Once lens drive has been carried out, the photographed data that was stored in DRAM 37 is next subjected to image processing for storage (S13). Here, the photographed data that was subjected to pixel interpolation processing in step S9 is subjected to image processing such as image compression processing etc. for storage, by the image processing section 29.

Once the image processing for storage has been carried out, image data is next stored in the flash memory 41 (S15). Once the image data has been stored in the flash memory 41, it is next determined whether or not movie storage is stopped (S17). Here, determination is carried out by detecting the operating state of the release button within the operating section 19. If the result of this determination is that movie storage has not stopped, processing returns to step S3, and movie shooting continues. On the other hand, if the result of the termination is that movie storage has stopped, the movie shooting operation is terminated.

Next, the pixel interpolation processing of step S9 will be described using the flowchart shown in FIG. 6. With the image sensor that was shown in FIG. 3A, a single pair of phase detection pixels were arranged so as to be aligned in the diagonal direction, but in this processing flow, in order to simplify the description, the phase detection elements have either the left or right half shielded from light, and the phase detection pixels are arranged so as to be aligned in the horizontal direction.

Also, when describing this processing flow the meaning of the following abbreviations is as follows.
af_pixel: pixel value of phase detection pixel, value with gain correction already applied
pixel_h_1: pixel value +1 to the left of phase detection pixel
pixel_h_2: pixel value +1 to the right of phase detection pixel
pixel_h_3: pixel value +2 to the left of phase detection pixel
pixel_h_4: pixel value +2 to the right of phase detection pixel
pixel_h_5: pixel value +3 to the left of phase detection pixel
pixel_h_6: pixel value +3 to the right of phase detection pixel
pixel_v_1: pixel value +1 above phase detection pixel
pixel_v_2: pixel value +1 below phase detection pixel If the processing flow for pixel interpolation processing is entered, it is first determined whether a pixel is a phase detection pixel (S21). Here, it is determined whether or not photographed data that has been read out from the DRAM 37 is data corresponding to a phase detection pixel. As described previously, the photographed data is a mix of data corresponding to normal pixels that are not used for phase detection and data corresponding to phase detection pixels, and so in this step it is determined whether or not data corresponds to a phase detection pixel. This determination is carried out based on pixel position.

If the result of determination in step S21 is that it is a phase detection pixel, then next differences between pixels immediately adjacent to the left and right, and above and below the phase detection pixel, are next calculated (S23). Here the change detection section 53 calculates |pixel_h_1−pixel_h_2| and |pixel_v_1−pixel_v_2|.

Next, depending on the difference values, a weighting is assigned to each direction, and an interpolation pixel value is calculated (S25). Here the smaller of the values |pixel_h_1−pixel_h_2| and |pixel_v_1−pixel_v_2| is weighted, and then an average is calculated. The meaning of the difference absolute value being low, is that it is determined that a correlation between a pixel that is going to be interpolated and pixels of that direction is high, and so pixels having a high correlation are weighted and added. In this way it is possible to carry out interpolation to maintain continuity of pixels.

Once interpolation pixel values have been calculated, differential values between pixels ±3 to the left and right of the phase detection pixel are calculated (S27). Here,
(pixel_h_5−pixel_h_3),
(pixel_h_3−pixel_h_1),
(pixel_h_1−pixel_h_2),
(pixel_h_2−pixel_h_4), and
(pixel_h_4−pixel_h_6) are calculated.

Next, a maximum value among the differential values is searched for (S29). Here, a maximum value among the absolute values of the differential values obtained in step S27 is obtained. Once the maximum value of differential value has been searched for, a differential integrated value is calculated (S31). Here, differential values obtained during step S27 are integrated.

Once the differential integrated value has been calculated, next, calculation of a weight coefficient suitable for the phase detection pixel is carried out from the maximum differential value (S33). Here, if an absolute value of the maximum value of differential value that was obtained in step S29 is within range of a fixed threshold value TH, the weight coefficient is made small, while if the absolute value is outside the range of fixed threshold value TH a weight coefficient suitable for interpolation calculation is calculated so that the weight coefficient becomes smaller the closer to the fixed range the maximum value is. The above described steps S23-S33 fulfill a function as a detection step of detecting at least one of a variation gradient, a variation amount and an integrated value of variation amount, for a pixel group that is close to the focus detection pixels (phase detection pixels) of the image sensor 21. Here, a variation gradient is made a difference value from a single adjacent pixel.

Next, a weight coefficients suitable for the phase detection pixel is calculated from the differential integrated value (S35). Here, if the differential integrated value that was obtained in step S31 is within range of a particular fixed threshold value th, the weight coefficient is made small, while if the value is outside the range of fixed threshold value th a weight coefficient suitable for interpolation calculation is calculated so that the weight coefficient becomes smaller the closer to the range the differential integrate value is. The above described steps S33 and S35 fulfill a function as a determination step of determining, based on the value of the at least one of the variation gradient, variation amount, and integrated value of variation amount that was detected in the detection step of steps S23-S31, an appropriate proportion for interpolation pixels in the phase detection pixels. An appropriate ratio for interpolation pixels means a weighting coefficient when mixing output values of the phase detection pixel and interpolation pixel values estimated from the peripheral pixels.

Once a weight coefficient has been calculated, output value of the phase detection pixel and interpolation pixels that have been estimated from the periphery are multiplied by that weight coefficient for averaging (S37). Here, interpolation calculation is carried out on the value of the phase detection pixel and values of pixels that are peripheral to the phase detection pixel, using the weight coefficient that was obtained in step S33 and a weight coefficient that was obtained in step S35. Accordingly, step S37 fulfills the function as an interpolation step of interpolating the phase detection pixel in accordance with the result of the detection step. With this embodiment, the weight coefficients that have been obtained in steps S33 and S35 are averaged to give a weight coefficient at the time of interpolation calculation. As well as obtaining an average value, it is also possible to determine weight coefficient using another calculation, such as multiplying the respective weight coefficients.

In this manner, in the flow for pixel interpolation processing, based on correlation values for upper, lower, left and right pixels, pixels that have correlation are weighted and averaged, so as to determine a correlative pixel value. Also, a proportion for applying interpolation pixel values is determined based on horizontal direction change gradient (in other words, degree of suddenness of change) and a differential integrated value (smoothness of change). When determining an appropriate proportion, if change gradient is close to within a particular fixed zone (a range that is not sudden but in which there is change) the probability of phase offset occurring is high, and so interpolation calculations is not carried out aggressively on the phase detection pixel.

Also, when determining an appropriate proportion, if the differential integrated value is close to a particular fixed zone (a range in which there is change, but it is smooth) the probability of phase offset occurring is high, and so interpolation calculations is not carried out aggressively on the phase detection pixel. Interpolation pixels are generated by mixing peripheral pixels for every appropriate proportion at which the interpolation pixel values and phase detection pixels (that have already been gain corrected) have been obtained.

The concept behind the interpolation processing of this embodiment will be described using FIG. 7A, FIG. 7B, and FIG. 8. FIG. 7A shows an example of output variation of the image sensor around a phase detection pixel when exposed to high-frequency in a focused state, while FIG. 7B shows an example of output variation of the image sensor around a phase detection pixel that has moved from high-frequency to a medium frequency in a non-focused state. In the focused state, as shown in FIG. 7A, a differential value between a phase detection pixel and adjacent pixels becomes high but a differential integrated value in the same direction does not become high. On the other hand, in the non-focused state, as shown in FIG. 7B, a differential value for adjacent pixels becomes low but a differential integrated value in one direction becomes high.

FIG. 8 is a drawing for explaining a manner of determining weight coefficient for every focused state, for a weight coefficient at the time of carrying out interpolation calculations with this embodiment. As shown in FIG. 8, focus state is divided into 3 stages of out of focus (significant bokeh), out of focus, and in-focus, and the degree of out of focus detection (A) is obtained from an integrated value of the differential value, and a weight coefficient is determined in accordance with this integrated value. Also, the degree of high frequency (B) is obtained from a maximum value of the differential value, and a weight coefficient is determined in accordance with this differential maximum value. Here, the assigned weight for out of focus detection (A) is 50%, the assigned weight for high-frequency (B) is 50%, and they are added to determine a correction weight (AND condition).

Weighting determination is as below:

$$A(\text{out of focus detection}): |\Sigma(n_i - n_{i-1})| < TH \quad (1)$$

$$B(\text{high frequency detection}): \max\{(|n_i - n_{i-1}|)\} < th \quad (2)$$

Here, threshold value TH assumes detection of an out of focus state of 60% extent, and the weight is changed depending on the extent. It is only necessary to set to a value of an extent that noise is discernible when viewed. Also, threshold value th assumes detection of a high frequency subject for 2 or 3 pixels extent, and weight is changed depending on the extent. It is only necessary for this threshold value th also to be set to a value of an extent such that noise is discernible when viewed.

As has been described above, with one embodiment of the present invention contrast information of a formed image is detected from pixels, among pixel data that has been output from an image sensor, that are positioned close to a phase detection pixel (S23-S31), whether or not data of the phase detection pixel is to be corrected is determined based on the contrast information, and if it is determined that correction will be carried out, a weighting for peripheral pixels to the phase detection pixel is determined (S33-S35). In this way, by determining a weighting for interpolation calculation using contrast information, in a case where abrupt change arises in some pixels, and even when there is no variation in other peripheral pixels, it is possible to reduce image degradation when carrying out correction processing.

Also, one embodiment of the present invention is provided with an image sensor 21 having imaging pixel groups and focus detection pixel groups (phase detection pixel groups), a gain adjustment section 51 for adjusting gain of the focus detection pixel groups (phase detection pixel groups), a change detection section 53 for detecting at least one of a variation gradient, a variation amount and an integrated value of variation amount, of a pixel group made up of non-phase detection pixels 21a that are around the phase detection pixels 21b of the image sensor 21, a pixel interpolation section 57 for interpolating the phase detection pixels in accordance with detection results of the change detection section 53, and an interpolation proportion determination section 55 for determining an appropriate proportion of interpolation pixels in the phase detection pixels based on a value of the at least one of a change gradient, change amount, and integrated value of change amount detected by the change detection section 53. As a result, in a case where abrupt change arises in some pixels, and even when there is no variation in other peripheral pixels, it is possible to reduce image degradation when carrying out correction processing.

With one embodiment of the present invention, when determining a weighting for interpolation calculation, both a difference added value and a difference local maximum value (maximum value) for pixels around the phase detection pixel are used, that is, an AND condition is applied. As a result, with either value, performance is reduced to some extent, but can be used. Also, in the case of using both values, a weighting for out of focus detection (A) is assigned to 50%, weighting for high-frequency (B) is assigned to 50%, and the 2 are added to determine a correction weight. However, it is also possible to change these proportions as appropriate.

Also, with one embodiment of the present invention, if movie shooting is selected correction of phase detection pixels is carried out. This is correction of phase detection pixels because often, during transition from a non-focus state to a focused state phase offset is very noticeable due to the effect of the previously described light shielding members 21c. This is not limiting, however, and it is also possible to carry out correction for phase detection pixels at the time of still pictures shooting, since lens offset becomes very noticeable if shooting in an out of focus state.

Also, with one embodiment of the present invention, difference calculation for adjacent pixels to the phase detection pixel is carried out within ±three pixels, but this is not limiting. It is possible to set an appropriate design value taking into consideration the interval between phase detection pixels, calculation processing times, and desired precision etc. It is also possible to vary the calculation range in accordance with defocus amount etc., without fixing the calculation range to ±3 pixels.

Further, with the one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In either case, the present invention can be applied provided it is an imaging device in which part of an image sensor is provided with phase detection pixels.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an image sensor provided with phase detection pixels for focus detection at some of its pixels,
a contrast information detection circuit that detects contrast information of a formed image from pixels, among pixel data output from the image sensor, positioned close to the phase detection pixels,
a phase detection pixel correction determination circuit that determines whether or not to correct data of the phase detection pixel based on the detected contrast information,
a weighting determination circuit that, when it has been determined by the phase detection pixel correction determination circuit that the phase detection pixel will be corrected, determines a weighting for output calculated from outputs of neighboring pixels to the phase detection pixels and gain corrected output of the phase detection pixel based on the detected contrast information,
a pixel correction circuit that carries out weighted correction of the phase detection pixels based on the determined weighting, and
a color conversion processing circuit that carries out conversion processing for display of the image data or to create an image for storage, after the pixel correction;
wherein the contrast information detection circuit detects a difference added value and a difference maximum value of pixels values for neighboring pixels to the phase detection pixel as contrast information.

2. The imaging device of claim 1, wherein:
the weighting determination circuit makes an appropriate proportion of interpolation pixels smaller in the case where the difference added value or the difference maximum value is small than in a case where the difference added value or the difference maximum value is large.

3. The imaging device of claim 1, wherein:
other phase detection pixels are not included in the peripheral pixels used in correction of the phase detection pixel.

4. The imaging device of claim 1, further comprising:
a shooting selection circuit that selects still picture shooting and movie shooting, wherein correction of the phase detection pixels is carried out when movie shooting has been selected.

5. An imaging device, comprising:
an image sensor provided with phase detection pixels for focus detection at some of its pixels,
a contrast information detection circuit that detects contrast information of a formed image from pixels, among pixel data output from the image sensor, positioned close to the phase detection pixels,
a weighting determination circuit that determines a weighting for output calculated from outputs of neighboring pixels to the phase detection pixels and gain corrected output of the phase detection pixel based on the detected contrast information,
a pixel correction circuit that carries out weighted correction of the phase detection pixels based on the determined weighting, and
a color conversion processing circuit that carries out, conversion processing for display of the image data or to create an image for storage, after the pixel correction;
wherein the contrast information detection circuit detects a difference added value and a difference maximum value for neighboring pixels of pixel values to the phase detection pixel as contrast information.

6. A control method for an imaging device having a group of imaging pixels and a group of phase detection pixels, comprising:

an adjustment step of adjusting gain for the phase detection pixel group,
  a detection step of detecting a difference added value and difference maximum value of pixel values, of a pixel group that is close to the phase detection pixels of an image sensor,
  a determination step of determining, based on the difference added value and difference maximum value that was detected in the detection step, an appropriate proportion of output calculated from outputs of the pixel group that is close to the phase detection pixel and the phase detection pixels, and
  an interpolation step of interpolating the phase detection pixels in accordance with the result of the determination step.

\* \* \* \* \*